Patented May 29, 1951

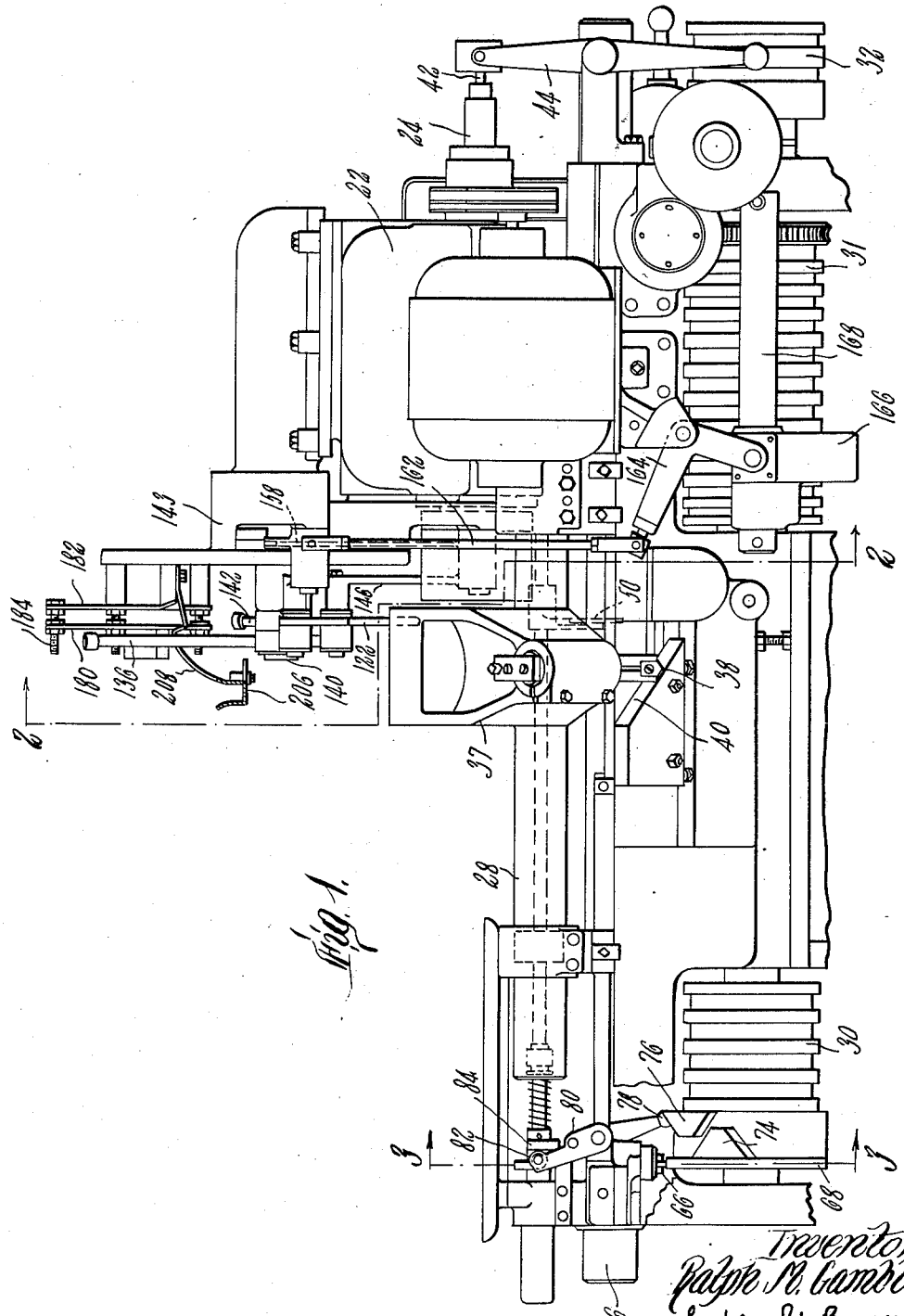

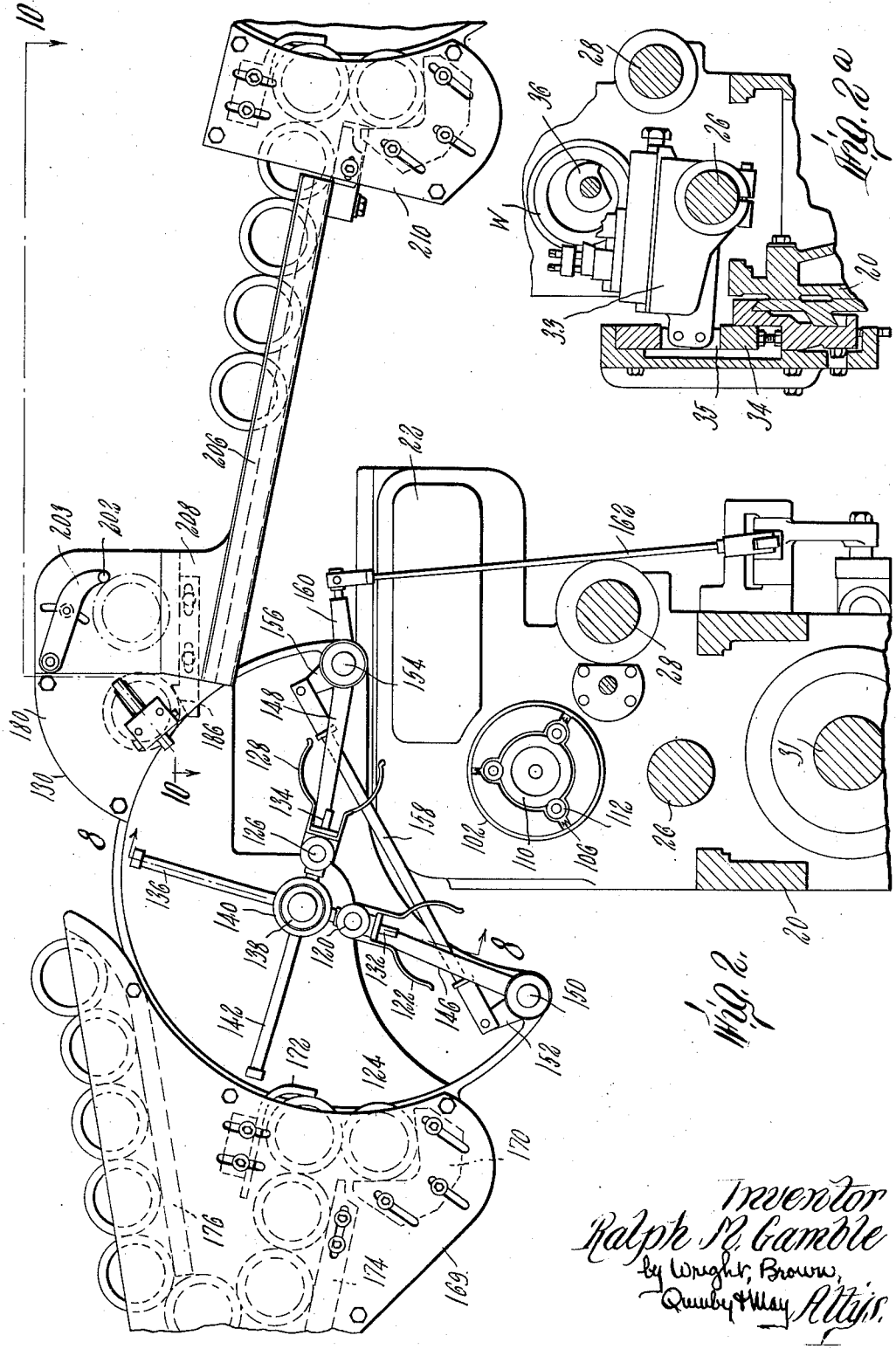

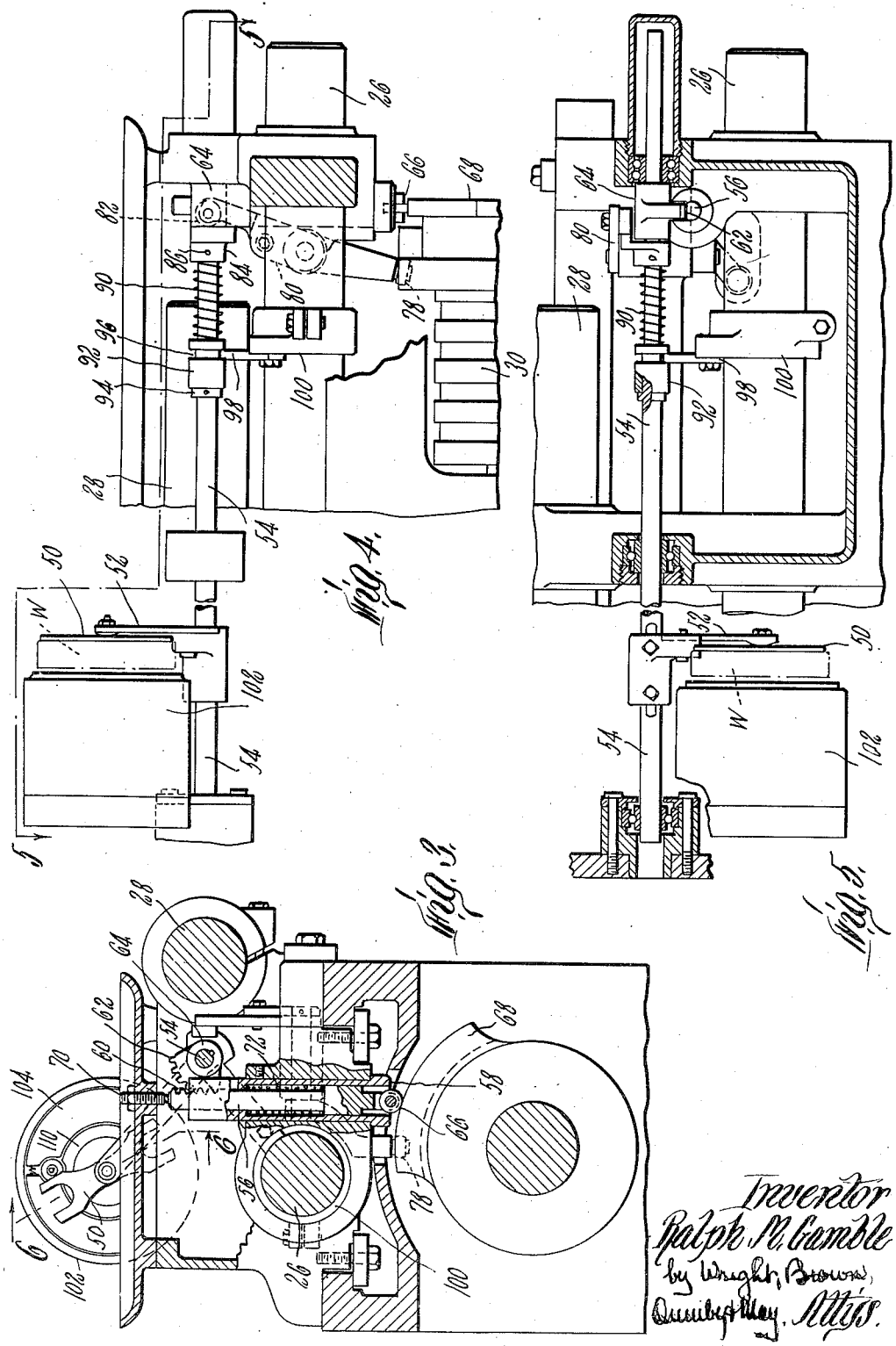

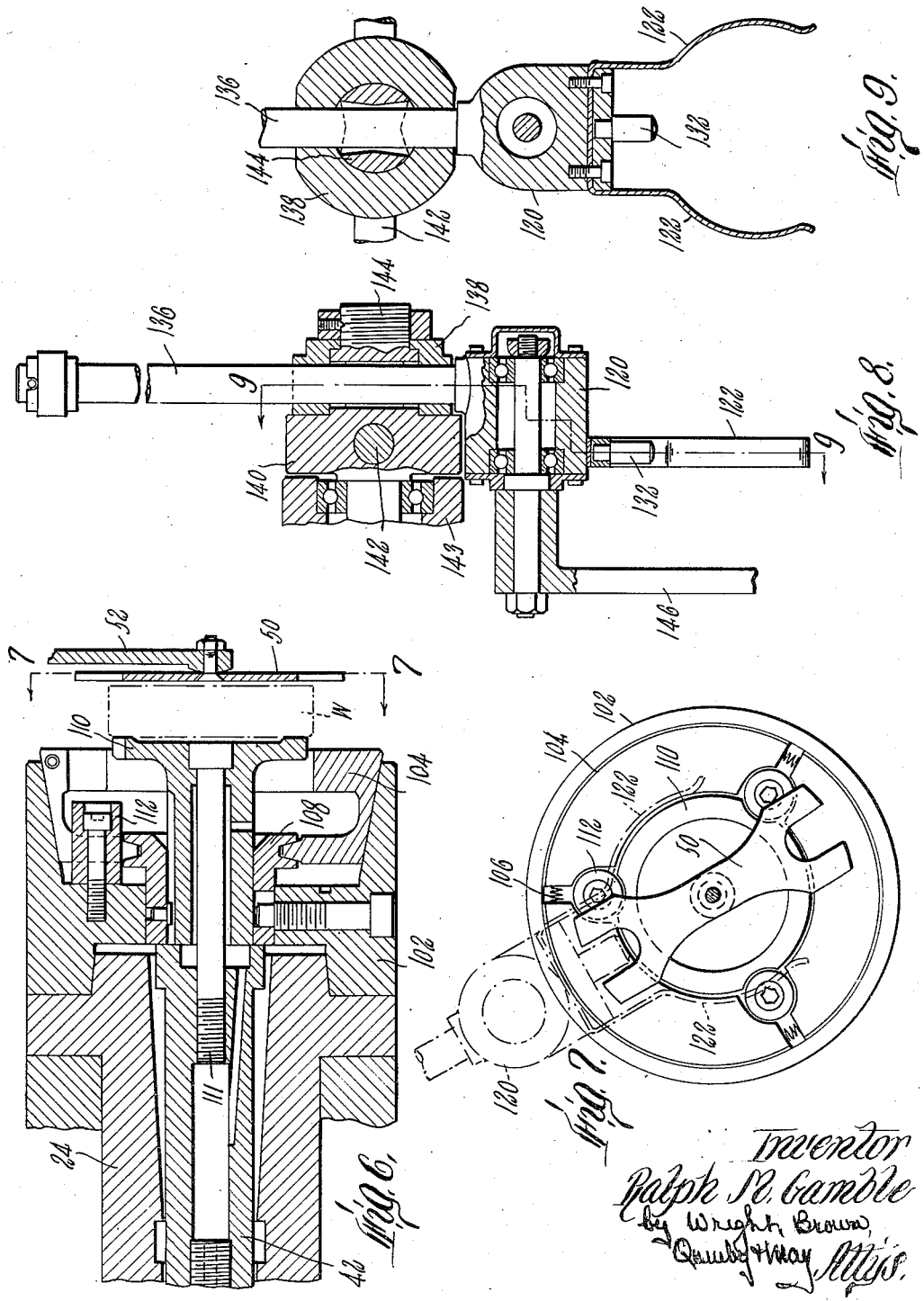

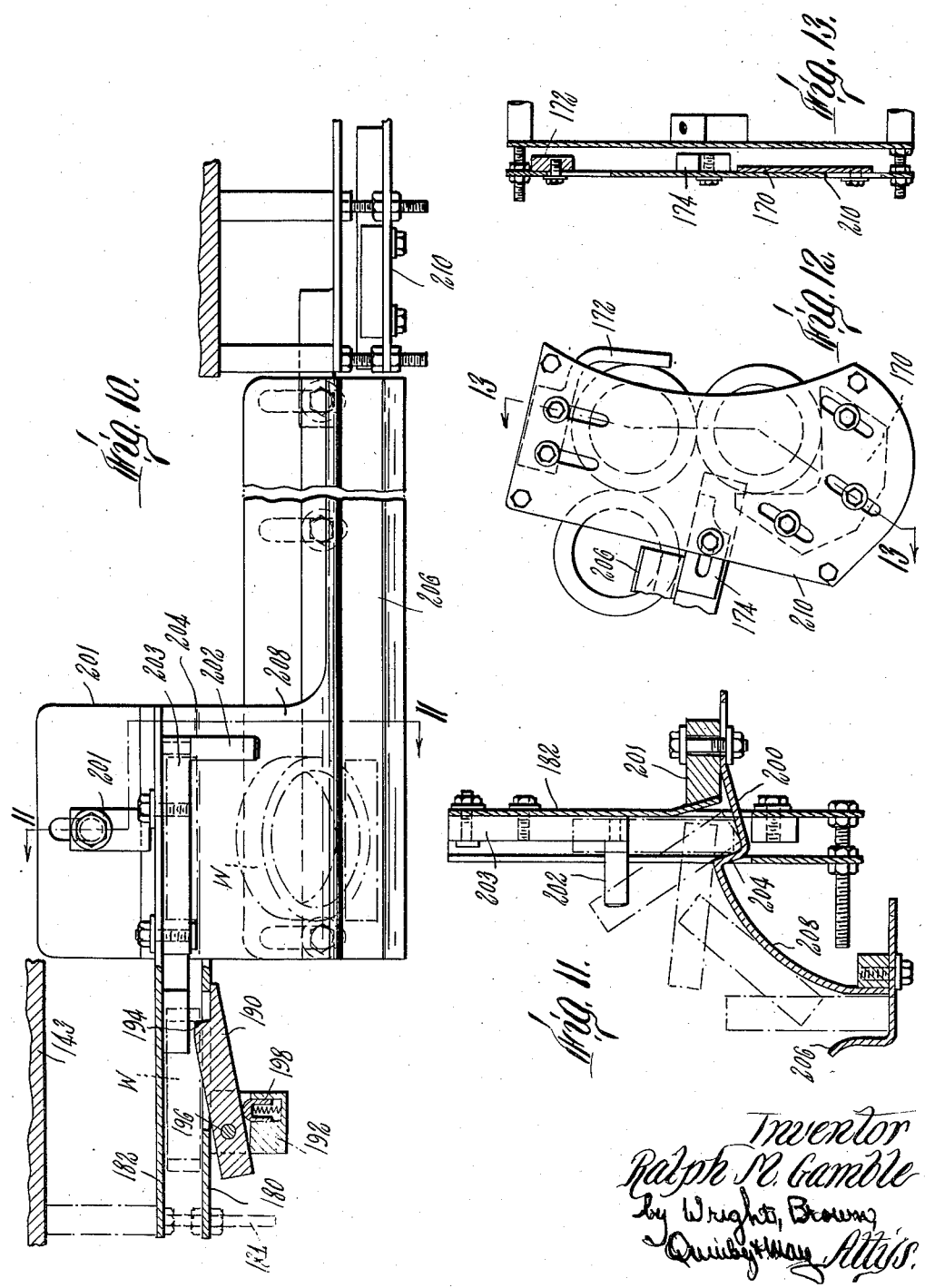

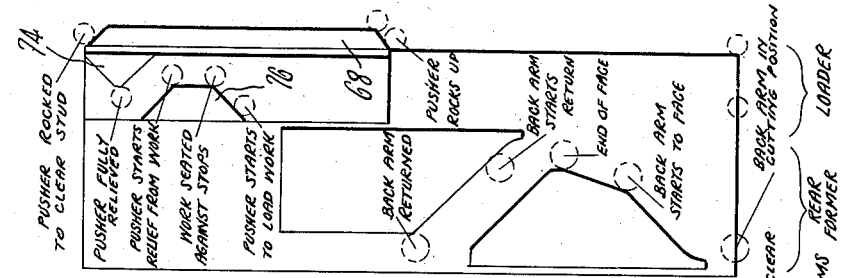
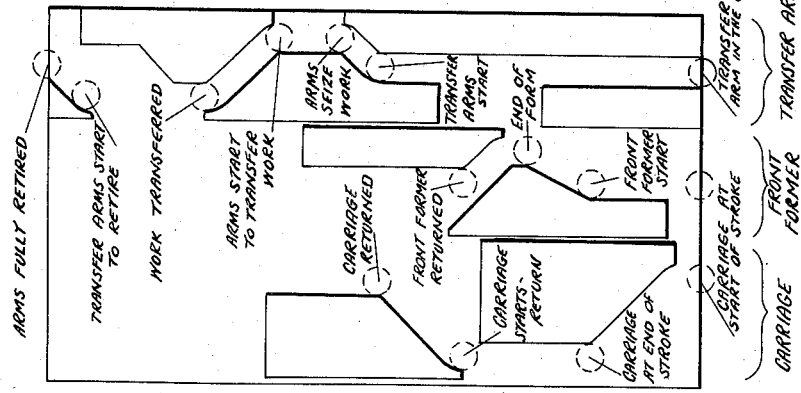
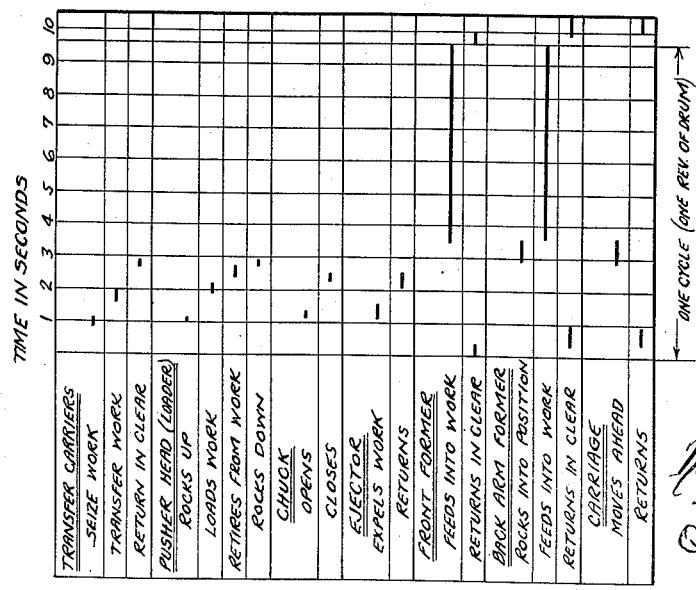

2,554,699

UNITED STATES PATENT OFFICE 2,554,699

GRIPPER TRANSFER DEVICE

Ralph M. Gamble, Springfield, Vt., assignor to Jones & Lamson Machine Company, Springfield, Vt., a corporation of Vermont Application January 26, 1946, Serial No. 643,617

2 Claims. (Cl. 10—166)

This invention relates to a gripper transfer device and means for presenting successive work pieces thereto. The mechanism is more particularly designed to handle ring-shaped or disc-shaped work pieces such, for example, as a ball bearing race. Such mechanism is described and shown as mounted on and used in connection with an automatic lathe capable of operating on the work pieces which are thus supplied and transferred.

For a more complete understanding of the invention, reference may be had to the following description thereof and to the drawings, of which:

Figure 1 is a rear elevational view of an automatic lathe embodying the invention;

Figure 2 is a sectional view on the line 2—2 of Figure 1, including also a supply hopper for a second lathe;

Figure 2a is a fragmentary transverse sectional view of the lathe, showing the carriage;

Figure 3 is a section on the line 3—3 of Figure 1;

Figure 4 is a fragmentary front elevational view of a portion of the automatic lathe shown in Figure 1;

Figure 5 is a plan view, partly in section on the line 5—5, of the portion of the apparatus shown in Figure 4;

Figure 6 is a fragmentary sectional view on the line 6—6 of Figure 3, showing the parts of the spindle head and chuck;

Figure 7 is a section on the line 7—7 of Figure 6;

Figure 8 is a section on the line 8—8 of Figure 2;

Figure 9 is a section on the line 9—9 of Figure 8;

Figure 10 is a section on the line 10—10 of Figure 2;

Figure 11 is a section on the line 11—11 of Figure 10;

Figure 12 is a fragmentary elevational view, on a larger scale, of the structure of the supply station shown in Figure 2;

Figure 13 is a section on the line 13—13 of Figure 12;

Figure 14 is a time chart showing a cycle of operation of the mechanisms which act on the work;

Figure 15 is a plane development of some of the cams on the cam drums.

A gripper transfer mechanism embodying the invention is shown in Figures 1 and 2 on an automatic lathe of the Fay type which has a headstock 22 having a spindle 24 with a chuck thereon to hold a work piece while a tool operates on it. The chuck is operated by an ejector rod 42 which carries an ejector head 110 to push work pieces out of the chuck. The latter also has a center bar 26, a back bar 28 and cam drums 30, 31, and 32. A tool carriage 33 with tools is mounted on the center bar 26 and controlled by a cam 34. Another tool 36 is mounted on an arm 37 carried by the back bar 28. This tool is controlled by a cam 40.

When a work piece is transferred to a loading position in line with the axis of the spindle, a pusher head 50 is operated to push it to the chuck. The pusher head is mounted on an arm 52 which extends radially from a shaft 54. Rocking movement of the shaft 54 is controlled by a cam 68 acting through a rack and pinion device 60, 62 as shown in Figure 3. Axial movement of the shaft 54 is controlled by cams 74, 76 through a lever 80 shown in Figures 1, 4, and 5.

Mechanism for feeding work pieces to and from the loading position is illustrated in Figures 1, 2, 8, and 9. As therein shown, a carrier head 120 having a pair of fingers 122 projecting therefrom is provided to transfer work pieces from a supply station 124 to the loading station in line with the chuck. A second carrier head 126 having fingers 128 is provided for the transfer of work pieces from the loading station to a delivery station 130. The carrier fingers 122 and 128 are similar in shape, each comprising a strip of resilient metal having an arcuate portion with a curvature to fit a part of the circumference of a work piece and a straight shank portion to give resilience to the finger so that the fingers of each pair can spring away from each other to admit a work piece between the ends thereof. Between the fingers 122 is an adjustable abutment element 132 which bears against the circumference of a work piece between the fingers so as to prevent the piece from being pushed too far in. In like manner, an abutment element 134 is mounted on the carrier head 126 between the fingers 128. The carrier head 120 is mounted at the end of a rod 136 which slides through a pivot block 138. This pivot block is rockably mounted on a second coaxial pivot block 140 through which slides a rod 142. On the end of this rod is mounted the carrier head 126. The pivot blocks 138 and 140 are independently rockable and are mounted on a bracket 143 on the headstock 22, the pivot block 140 having an extension 144 through the block 138 to hold the latter in assembled relation therewith. The carrier heads 120 and 126 are moved along predetermined arcuate paths by rock arms 146 and 148, respectively, to which they are pivotally attached. The rock arm 146 rocks about an axis 150 together with a short lever arm 152. The rock arm 148 rocks about an axis 154 together with a short lever arm 156. The ends of the arms 152 and 156 are connected by a rod 158 so that all four arms rock simultaneously. A fifth arm 160 rocks about the axis 154 with the arms 148 and 156. The arm 160 is connected by a rod 162 to a bell crank 164 (Figure 1), the other end of the bell crank being connected to a carrier 166 which travels on a fixed rod 168 and is actuated by cams (Figure 15) on the cam drum 31.

The carrier head 120 is swung by the arm 146 to present its fingers 122 at the supply station 124. At this station is a hopper comprising a pair of parallel plates 169 spaced apart to receive ring-shaped or disc-shaped work pieces flatwise so as to hold the work pieces therein in a common plane as indicated in Figure 2. Between the two walls are guide members by which the work pieces are presented one after the other to a point where they can be engaged by carrier fingers 122. This position is determined by a guide block 170 and guide members 172, 174, and 176. These guide members are preferably secured to the front wall of the hopper by bolts and nuts or other suitable means, these bolts passing through slots in the wall whereby suitable adjustments of the position of each guide member can be made for the purpose of accommodating work pieces of different diameters. The walls of the hopper are also preferably adjustable from or toward each other to accommodate work pieces of different thicknesses. The neutral or idle position of the carrier heads 120 and 126 is illustrated in Figure 2. At suitable times in the cycle of operation of the lathe the carrier heads are moved from this position to a position in which the fingers 122 are upon the circumference of the nearest work piece at the supply station 124 and the space between the fingers 128 of the carrier head 126 is in line with the work piece held by the chuck. When this work piece has been released from the chuck, the ejector rod ejects the work piece axially into the space between the fingers 128. The carrier heads are then swung through their paths of motion by the respective arms 146 and 148 so that the work piece which has been seized at the supply station is moved into the loading station in line with the chuck and the work piece which has been received at the loading station from the chuck is transferred to the delivery station 130. The structure at this station preferably comprises two parallel walls 180 and 182 as shown in Figure 1. These walls are held in spaced relation by a number of bolts 184 with nuts which can be adjusted to vary the space between the walls so as to accommodate work pieces of different thicknesses. An adjustable platform member 186 is bolted to the front wall 180 to support work pieces delivered by the carrier head 126, the platform being longitudinally inclined to the final portion of the path taken by a work piece when it is delivered to the station 130. As each work piece is pushed up on the platform 186 by the carrier head, it is caught and retained against retraction by a latch member 190 which is rockably mounted on a bracket 192 secured to the wall 180. This latch member has a shoulder 194 which projects into the central space of a ring-shaped work piece thrust into the position indicated in Figure 10. The latch member 190 is pivoted at 196 and is rocked by a spring pressed plunger 198 to move the shoulder 194 into position to catch the work piece and prevent its retraction. The latch 190 and the platform 186 support the work piece until it is pushed along by the next work piece to a transversely sloping floor member 200 which is adjustably secured to the rear wall 182 by a bracket 201 (Figure 11). The forward progress of the work piece is limited by a stop pin 202 which is supported on an arm 203 by which its elevation can be adjusted. The front wall 180 is cut away beyond the platform 186 so that when a work piece moves from the platform to the floor 200 and hits the pin 202, it falls away from the rear wall 182, trips on an upstanding flange 204, and, as indicated, tumbles into a trough 206 which is below and laterally offset from the floor 200. From the flange 204 a curved guiding apron 208 extends down to the trough 206 to guide work pieces falling from the hopper into the trough. The width of the trough is adjustable as indicated in Figure 11 to accommodate work pieces of different thicknesses. The trough 206 slopes downwardly to a supply hopper 210 which is in a position to cooperate with transfer mechanism for a second automatic lathe, such transfer mechanism being preferably similar to that hereinbefore described in connection with the lathe shown in Figure 1. This hopper is preferably constructed in a manner similar to the construction of the supply hopper at the station 124, including two parallel walls which are adjustable toward or from each other to accommodate work pieces of different thicknesses, and guide members adjustably bolted to the front wall of the hopper to accommodate work pieces of different diameters.

Since the machine is operated from a single drive, the movements of all the parts can be correlated by suitable adjustments of the cams on the cam drums, some of these cams being indicated diagrammatically in Figure 15. The arrangement of cams therein shown results in a cycle of operations indicated in the chart shown in Figure 14. The cycle may be thought of as beginning with the termination of the tooling operations, when the rotation of the spindle is stopped for the removal of the work piece therefrom. The former cams and the carriage are returned to their inactive positions, thus moving the tools away from the work and retracting the pusher head. The transfer carriers are thereupon moved from their idle intermediate positions, one carrier going to the loading station to get the work piece which has been tooled, the other carrier going to the supply station to grab a fresh work piece, and the pusher head is rocked up into line with the spindle axis. Then the ejector rod is actuated to open the chuck and to push the work piece from the chuck to the waiting fingers of the transfer carrier, the pusher head acting as a limit stop. The transfer carrier simultaneously remove the tooled work piece from the loading station to the delivery hopper and bring the fresh work piece from the supply station to the loading station. The pusher head, which is in its elevated position in line with the spindle, is moved by its cam to push the work piece into the chuck, the ejector rod being retracted to close the chuck. The pusher is retracted from the work and its head is then swung down to its lower position while the carriers return to their idle position. The carriage moves into operating position, pushing the pusher ahead of it. The back arm is rocked to bring its tool to the work. Then the former cams are caused to travel to move the tools into cutting engagement with the work. At the conclusion of the cutting or forming operation, the formers and carriage are retracted and the cycle is repeated.

Figure 15 is a plane development of the cam drums showing an arrangement of cams thereon designed to bring about the foregoing cycle of operations. The cam followers, which are indicated as dotted circles, can be thought of as having an upward relative motion in this figure. Thus, the cycle of operations indicated in Figure 14 begins when the cam followers have travelled upward on the cam diagram in Figure 15 about one-fourth of the way to the top. It is evident from the arrangement of the cams that the carriage returns to its inactive position (thereby retracting the pusher shaft) before the pusher is rocked by the cam 68 to swing the pusher head into line with the spindle, and that the pusher head is swung out of line before the carriage moves ahead again. It is in this interval while the pusher head is in line with the spindle that the pusher is advanced by the cam 76 and allowed to be pushed back by the spring 90 when the cam 74 acts on the lever 80.

I claim:

1. In a mechanism for supplying ring-shaped work-pieces to an automatic machine including a supply hopper, an inclined channel leading to said hopper, and a pair of claws operable to seize successive work-pieces at said hopper, means for restraining a line of work-pieces in said channel and presenting them successively to said claws, said means consisting of an adjustably fixed stop element opposite the lower end of said channel and spaced therefrom a distance slightly more than the diameter of a work-piece, and a support element adjustably fixed to extend beyond said end of the channel and offset below said end by a distance approximately equal to the diameter of a work-piece.

2. In a mechanism for supplying ring-shaped work-pieces to an automatic machine including a pair of jaws operable to seize and transfer a work-piece, means for presenting work-pieces one by one to said jaws, said means comprising a pair of plates in vertical parallel planes spaced slightly more than the axial dimension of a work-piece, an inclined rail terminating at its lower end between said plates, a stop element adjustably fixed opposite said rail end and spaced therefrom a distance slightly more than the diameter of a work-piece, and an L-shaped support element for a work-piece adjustably fixed between said plates below and beyond said lower end of the rail.

RALPH M. GAMBLE.

REFERENCES CITED

The following references are of record in the file of this patent:

UNITED STATES PATENTS

| Number | Name | Date |
|---|---|---|
| 323,180 | Mason | July 28, 1885 |
| 799,962 | Ayars | Sept. 19, 1905 |
| 1,069,319 | Cole | Aug. 5, 1913 |
| 1,444,929 | McEwan | Feb. 13, 1923 |
| 1,471,032 | Johnson | Oct. 16, 1923 |
| 1,734,868 | Milne | Nov. 5, 1929 |
| 1,765,825 | Cork | June 24, 1930 |
| 1,841,988 | Smith | Jan. 19, 1932 |
| 1,947,610 | McNamara | Feb. 20, 1934 |
| 2,112,119 | Rowe | Mar. 22, 1938 |
| 2,198,976 | Rober | Apr. 30, 1940 |
| 2,238,328 | Johnson | Apr. 15, 1941 |
| 2,344,461 | Hermani | Mar. 14, 1944 |
| 2,359,939 | Reynolds | Oct. 10, 1944 |

FOREIGN PATENTS

| Number | Country | Date |
|---|---|---|
| 517,821 | Germany | Feb. 12, 1931 |